United States Patent
Lee et al.

(10) Patent No.: US 6,801,273 B2
(45) Date of Patent: Oct. 5, 2004

(54) APPARATUS AND METHOD FOR INJECTING AND SEALING LIQUID CRYSTAL

(75) Inventors: Sang Mun Lee, Kyungsangbuk-do (KR); Joung Ho Ryu, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 349 days.

(21) Appl. No.: 09/764,112

(22) Filed: Jan. 19, 2001

(65) Prior Publication Data

US 2001/0015790 A1 Aug. 23, 2001

(30) Foreign Application Priority Data

Jan. 19, 2000 (KR) .......................................... P2000-2456

(51) Int. Cl.[7] .............................................. G02F 1/13
(52) U.S. Cl. .............................. 349/89; 349/87; 349/90
(58) Field of Search ............................. 349/87, 89, 90, 349/187, 189, 190

(56) References Cited

U.S. PATENT DOCUMENTS

| | | | | |
|---|---|---|---|---|
| 4,099,550 A | * | 7/1978 | Matsuzaki et al. ............. | 141/51 |
| 4,222,635 A | * | 9/1980 | Julke .......................... | 349/190 |
| 4,610,510 A | * | 9/1986 | Funada et al. ............... | 349/187 |
| 5,106,441 A | * | 4/1992 | Brosig et al. ................ | 156/104 |
| 5,359,442 A | * | 10/1994 | Tanaka et al. ............... | 349/189 |
| 5,406,989 A | * | 4/1995 | Abe .............................. | 141/7 |
| 5,477,349 A | * | 12/1995 | Fujiwara ..................... | 349/189 |
| 5,568,297 A | * | 10/1996 | Tsubota et al. .............. | 156/145 |
| 5,629,787 A | * | 5/1997 | Tsubota et al. ............. | 349/153 |
| 5,725,032 A | * | 3/1998 | Oshima et al. ................ | 141/7 |
| 5,835,181 A | * | 11/1998 | Nakamura et al. .......... | 349/189 |
| 5,862,839 A | * | 1/1999 | Nakamura et al. ............ | 141/7 |
| 5,936,695 A | * | 8/1999 | Hida et al. .................. | 349/153 |
| 6,095,203 A | * | 8/2000 | Yamamoto et al. ........... | 141/59 |
| 6,211,938 B1 | * | 4/2001 | Mori .......................... | 349/190 |
| 6,271,907 B1 | * | 8/2001 | Masaki et al. .............. | 349/189 |
| 6,283,175 B1 | * | 9/2001 | Shimazu ...................... | 141/98 |

FOREIGN PATENT DOCUMENTS

JP          05307160 A  * 11/1993  ............. G02F/1/13

* cited by examiner

Primary Examiner—Kenneth Parker
(74) Attorney, Agent, or Firm—McKenna Long & Aldridge LLP

(57) ABSTRACT

A liquid crystal injecting/sealing apparatus for injecting a liquid crystal into a liquid crystal display panel and sealing it. In the apparatus, an elevator is installed at the end of the injecting apparatus to convey the liquid crystal display panel from the injecting apparatus into the sealing apparatus. A residual liquid crystal remover removes a contaminated liquid crystal at the periphery of the liquid crystal injection hole. A sealer seals the liquid crystal injection hole with a sealant. An ultraviolet irradiating unit hardens the sealant.

25 Claims, 5 Drawing Sheets

APPARATUS AND METHOD FOR INJECTING AND SEALING LIQUID CRYSTAL

This application claims the benefit of Korean Patent Application No. 2000-2456, filed on Jan. 19, 2000, the entirety of which is hereby incorporated by reference as if fully set forth herein.

BACKGROUND OF THE INVENTION

1. Field of the Invention

The present invention relates to a liquid crystal display, and more particularly, to an apparatus and method for injecting a liquid crystal into a liquid crystal display panel and sealing it.

2. Discussion of the Related Art

Generally, an active matrix liquid crystal display (LCD) uses a thin film transistor (TFT) as a switching device to display a moving picture. Since the LCD can be made smaller in size than the existing cathode ray tube (CRT), it has been widely used in various applications including a display for personal computer, or a notebook computer, as well as an office automation equipment (e.g., a copy machine) and a portable equipment (e.g., a PDA or a pager).

A process of fabricating the active matrix LCD includes substrate cleaning, substrate patterning, alignment film formation, substrate adhesion/liquid crystal injection and packaging steps. In the substrate cleaning process, a foreign substance on the substrates is removed by a cleaner before and after patterning of the upper and lower substrates. The substrate patterning process is divided into a step of patterning the upper substrate and a step of patterning the lower substrate. On the upper substrate, color filters, a common electrode and black matrices, are formed. Signal wires such as data lines and gate lines are formed on the lower substrate. A thin film transistor (TFT) is formed at each intersection of the data lines and the gate lines. A pixel electrode is formed at each pixel area defined by the data lines and the gate lines and connected to a source electrode of the TFT. In the substrate adhesion/liquid crystal injection process, an alignment film is coated on the lower substrate and a rubbing step is performed which are sequentially followed by an upper/lower substrate adhesion step, liquid crystal injection step and an injection hole sealing step. Finally, in the packaging process, a tape carrier package (TCP) mounted with integrated circuits (ICs) such as a gate driver and a data driver is connected to a pad portion on the substrate.

In such an LCD fabricating method, a process of injecting a liquid crystal into the liquid crystal display panel has been performed by a liquid crystal injecting apparatus as shown in FIG. 1.

Referring to FIG. 1, the conventional liquid crystal injecting apparatus includes a loader 2 loaded with cassettes, first and second pre-heaters 4 and 6 for heating a liquid crystal display panel conveyed from the loader 2, a vacuum unit for making the interior of the liquid crystal display panel into a vacuum state, and a bubble remover 16 for removing air bubbles within the liquid crystal display panel. The loader 2 is mounted with cassettes, each of which has been vertically loaded with a liquid crystal display panel. The first pre-heater 4 activates humidity and ionized contaminants, etc. at the interior of the liquid crystal display panel and evacuates them into the exterior of the liquid crystal display panel. The second pre-heater 6 heats the liquid crystal display panel to relieve stress on the liquid crystal display panel. The vacuum unit 8 causes the space for liquid crystal injection to be in a vacuum state of $10^{-6}$ Torr so that the liquid crystal can be injected into the interior of the liquid crystal display panel. The first injector 10 is converted from the vacuum state to the atmospheric state to primarily inject the liquid crystal into the liquid crystal injecting space. The second injector 12 secondarily injects the liquid crystal into the liquid crystal injecting space in the atmospheric state. The unloader 14 is loaded with the cassettes, each of which is mounted with the liquid crystal display panel into which a liquid crystal has been injected.

In operation, the liquid crystal display panel as discussed above is vertically loaded in the cassette such that the liquid crystal injection hole points downward to be mounted onto the loader 2. The cassette mounted onto the loader 2 is conveyed to the first pre-heater 4 by means of a conveyor (not shown). The first pre-heater 4 heats the liquid crystal display panel to a desired temperature to activate humidity and ionized contaminants at the interior of the liquid crystal display panel, thereby forcing them to the exterior of the liquid crystal display panel. The liquid crystal display panel heated at the first pre-heater 4 is conveyed to the second pre-heater 6. The second pre-heater 6 heats the liquid crystal display panel at a desired temperature to relieve stress on the liquid crystal display panel. The liquid crystal display panel heated at the second pre-heater 6 is conveyed to the vacuum unit 8. The vacuum unit 8 cuases the liquid crystal injecting space to be in a vacuum state so that liquid crystal can be injected into the interior space of the liquid crystal display panel. The liquid crystal display panel, in the vacuum state, is moved into the first injector 10. Thereafter, the first injector 10 receives nitrogen from a nitrogen supplier (not shown) to convert the LCD panel from the vacuum state to the atmospheric state. At this time, the liquid crystal in which air bubbles are removed is primarily injected from the bubble remover 16 by a pressure difference between the liquid crystal injecting space and the first injector 10. Thereafter, the liquid crystal display panel is moved into the second injector 12. The second injector 12 secondarily injects the liquid crystal into the liquid crystal display panel while maintaining the atmospheric state. By this procedure, a desired number of liquid crystal display panels loaded in the cassette is injected. The liquid crystal display panels into which liquid crystal has been injected are moved into the unloader 14. The liquid crystal display panels moved into the unloader 14 are conveyed into a liquid crystal sealing apparatus to seal the liquid crystal injection hole.

FIG. 2 is a block diagram showing a configuration of a conventional sealing apparatus employing a dispenser system. Referring to FIG. 2, the conventional sealing apparatus of the dispenser system includes a loader 18 mounted with a cassette loaded with a desired number of liquid crystal display panels, first and second inverters for inverting the liquid crystal display panels conveyed from the loader 18, a residual liquid crystal remover 23 for removing contaminated liquid crystal at the periphery of a liquid crystal injection hole in a liquid crystal injection process, a sealer 24 for sealing the liquid crystal injection hole, an ultraviolet irradiating unit 25 for hardening a sealant sealed at the sealer 24, a third inverter 26 for inverting the liquid crystal display panels, and an unloader 28 mounted with the cassette. The liquid crystal display panel into which a liquid crystal panel has been injected by the liquid crystal injecting apparatus is vertically loaded in the cassette to be mounted into the loader 18. Each of the first and second inverters 20 and 22 rotates the liquid crystal display panel by 90° in the same direction to make a total rotation of 180°. The residual liquid crystal remover 23 jets nitrogen at a high pressure to remove liquid crystal formed at the liquid crystal injection hole. The sealer 24 seals the liquid crystal injection hole using a sealant. The ultraviolet irradiating unit 25 irradiates an ultraviolet ray to harden the sealant. The third inverter 26 rotates the liquid crystal display panel by 90°. The unloader 28 is mounted with a cassette which is loaded with the liquid crystal display panel in which the liquid crystal sealing process has been finished.

In operation, the liquid crystal display panel into which liquid crystal has been injected is vertically loaded in the cassette such that the liquid crystal injection hole points downward to be mounted onto the loader 18. The cassette mounted onto the loader 18 is conveyed to the first inverter 20 by means of a conveyor (not shown). The first inverter 20 rotates the liquid crystal display panel by 90° and then conveys it to the second inverter 22. The second inverter 22 rotates the liquid crystal display panel by 90° in the same direction as the first inverter 20. In other words, the first and second inverters 20 and 22 rotate the liquid crystal display panel by 180° to point the liquid crystal injection hole upward so that the liquid crystal injection hole can be sealed at the sealer 24. A desired number of liquid crystal display panels loaded in a cassette is positioned in parallel in a vertical state such that the liquid crystal injection hole points upward to be conveyed to the sealer 24. A dispenser (not shown) of the sealer 24 coats the liquid crystal injection hole with a sealant to sequentially seal the liquid crystal injection hole. The liquid crystal display panel in which the liquid crystal injection hole has been sealed is conveyed to the ultraviolet irradiating unit 25. The ultraviolet irradiating unit 25 irradiates an ultraviolet ray onto the liquid crystal injection hole to harden the sealant. Thereafter, the liquid crystal display panel is conveyed to the third inverter 26. The third inverter 26 rotates the liquid crystal display panel by 90° so that the cassette loaded with the liquid crystal display panel can be mounted in the unloader 28. The cassette, rotated by the third inverter 26, is mounted in the unloader 28.

However, such a conventional sealing apparatus of the dispenser system has the sealant remaining in a different state because a plurality of liquid crystal injection holes are sequentially sealed. Accordingly, cell gap uniformity deteriorates during the process of hardening the sealant causing a problem relating to picture quality. Also, a considerable process time, including sealing time for sequentially sealing the liquid crystal injection holes and inverting time for inverting the liquid crystal display panels is required reducing productivity.

FIG. 3 is a block diagram showing a configuration of a conventional sealing apparatus of a pin-transcriber system. Referring to FIG. 3, the conventional liquid crystal sealing apparatus includes loaders/unloaders 30 and 36 mounted with a cassette loaded with liquid crystal display panels, inverters 32 and 38 for inverting the liquid crystal display panels conveyed from the loaders/unloaders 30 and 36 by 180°, sealers 34 and 40 for sealing liquid crystal injection holes defined in the inverted liquid crystal display panels, and an ultraviolet irradiating unit 42 for hardening a sealant. The liquid crystal display panels into which liquid crystal has been injected by the liquid crystal injecting apparatus are vertically loaded in the cassette to be mounted in the first and second loaders/unloaders 30 and 36. The first and second inverters 32 and 38 rotate the liquid crystal display panels by 180°. The first and second sealers 34 and 40 seal the liquid crystal injection holes using a sealant. The ultraviolet irradiating unit 42 irradiates an ultraviolet ray to harden the sealant.

In operation, the liquid crystal display panels into which liquid crystal has been injected in the liquid crystal injecting process are separated from the cassette. A desired number of liquid crystal display panels separated from the cassette are mounted in a jig (not shown). Thereafter, the jig is mounted in the first loader/unloader 30 such that the liquid crystal injection holes point downward. The jig mounted in the first and second loader/unloader 30 is conveyed to the first inverter 32 by means of a conveyer (not shown). The first inverter 32 rotates the jig by 180° to point the liquid crystal injection holes upward. Thereafter, the jig is conveyed to the first sealer 34. The first sealer 34 seals the liquid crystal injection holes using a sealing device (not shown). At this time, the liquid crystal injection holes of the liquid crystal display panels mounted in the jig are simultaneously sealed. Thereafter, the ultraviolet irradiating unit 42 irradiates an ultraviolet ray to harden the sealant. After the sealant is hardened, the jig is rotated by 180° at the first inverter 32 to be conveyed to the first loader/unloader 30. Since a process of sealing the liquid crystal display panels at the second loader/unloader 36, the second inverter 38 and the second sealer 40 is identical to the foregoing process, an explanation as to this process will be omitted.

Such a conventional sealing apparatus of the pin-transcriber system requires a considerable process time including mounting time for mounting the liquid crystal display panels in the jig and inverting time for inverting the liquid crystal display panels to reduce productivity.

SUMMARY OF THE INVENTION

Accordingly, the present invention is directed to an apparatus and method for injecting and sealing liquid crystal into a liquid crystal display panel that substantially obviates one or more of the problems due to limitations and disadvantages of the related art.

An advantage of the present invention is a liquid crystal injecting/sealing apparatus and method that is capable of shortening process time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal injecting/sealing apparatus according to one aspect of the present invention includes an elevator installed at the end of said injecting apparatus to convey a liquid crystal display panel from the injecting apparatus into said sealing apparatus; a residual liquid crystal remover for removing contaminated liquid crystal at a periphery of the liquid crystal injection hole; a sealer for sealing the liquid crystal injection hole with a sealant; and an ultraviolet irradiating unit for hardening the sealant.

In another aspect of the present invention, a method of injecting and sealing liquid crystal includes automatically conveying a plurality of liquid crystal display panels into which liquid crystal has been injected to a sealing apparatus for sealing injection holes of the liquid crystal display panels; and collectively sealing said injection holes of the liquid crystal display panel using a roller in said sealing apparatus and thereafter collectively hardening them.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
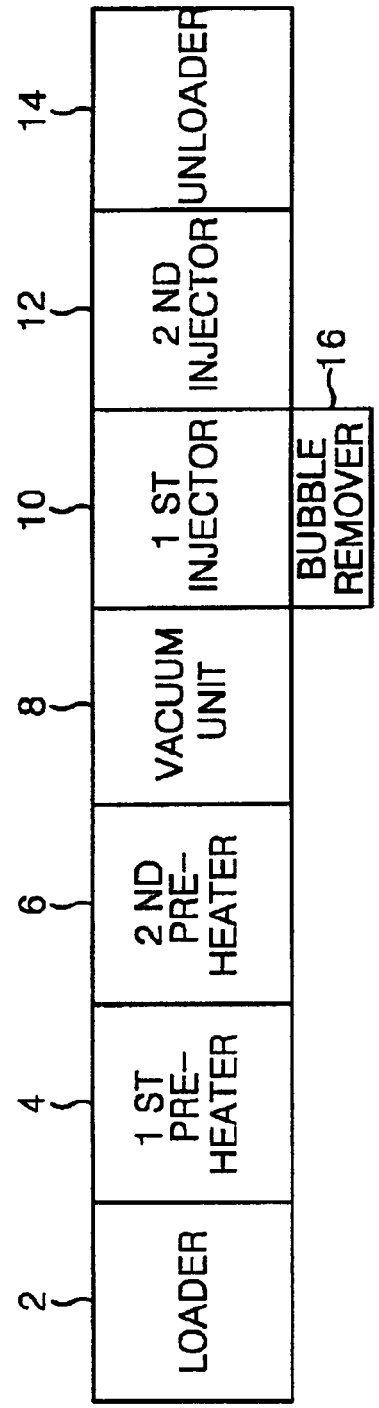
FIG. 1 is a block diagram showing a configuration of a conventional liquid crystal injecting apparatus.
Figure 2:
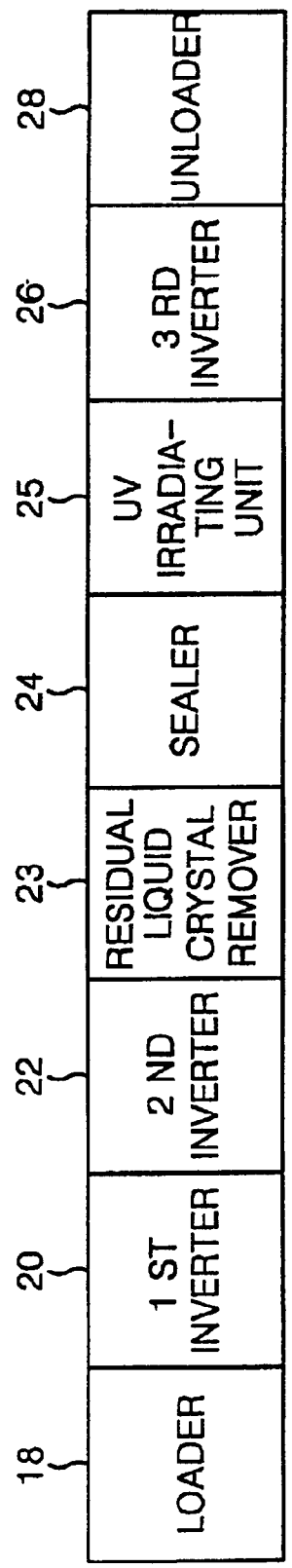
FIG. 2 is a block diagram showing a configuration of a conventional sealing apparatus of a dispenser system.
Figure 3:
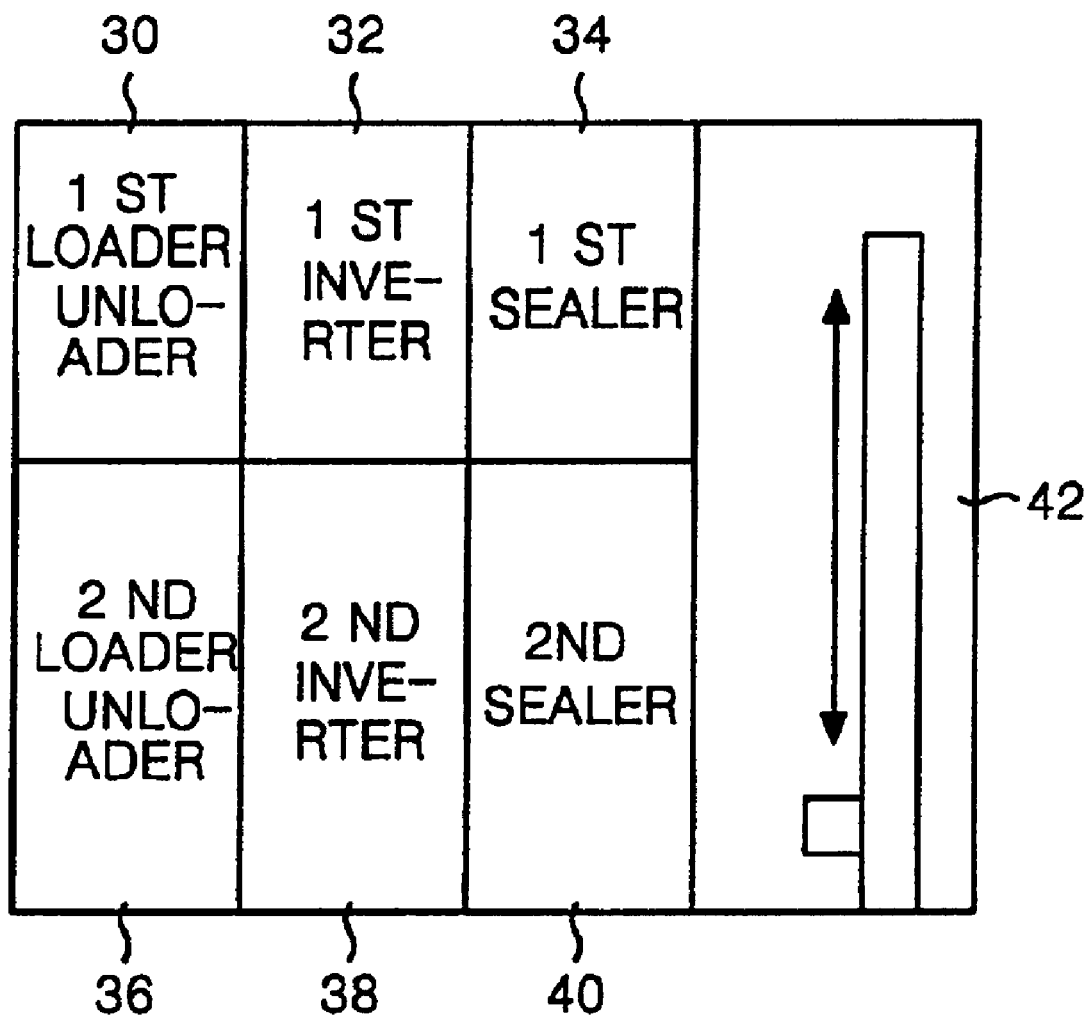
FIG. 3 is a block diagram showing a configuration of a conventional sealing apparatus of a pin-transcriber system.
Figure 4:
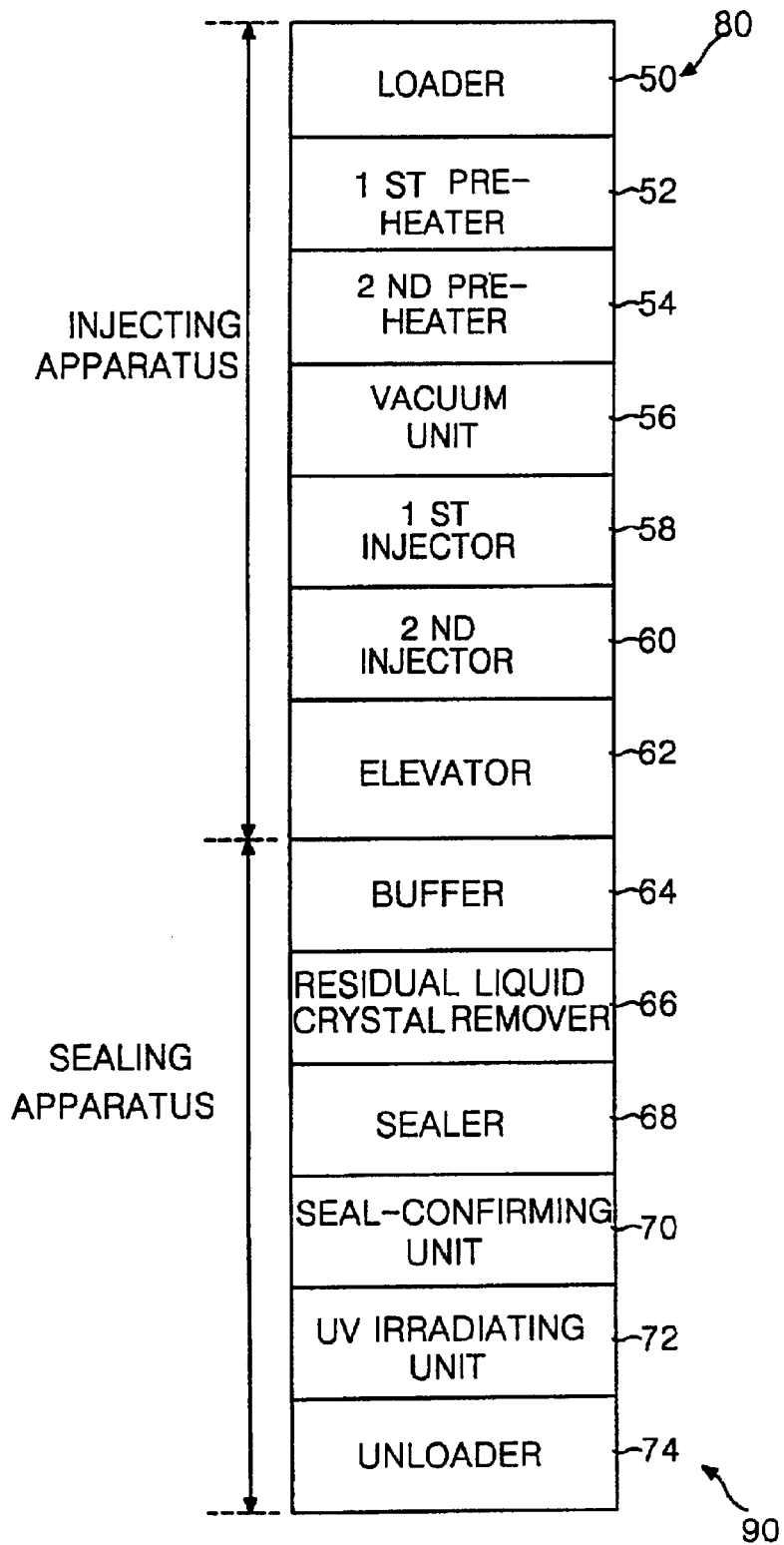
FIG. 4 is a block diagram showing a configuration of a liquid crystal injecting/sealing apparatus according to an embodiment of the present invention.

Referring to FIG. 4, there is shown a liquid crystal injecting/sealing apparatus according to an embodiment of the present invention. The liquid crystal injecting/sealing apparatus includes an injecting apparatus 80 and a sealing apparatus 90 arranged in an in-line fashion. The injecting apparatus 80 includes a loader 50, a first pre-heater 52, a second pre-heater 54, a vacuum unit 56, a first injector 58, a second injector 60 and an elevator 62. This injecting apparatus 80 is identical to the conventional injecting apparatus shown in FIG. 1, except that it is arranged in an in-line fashion with the sealing device 90 by way of the elevator installed at the end thereof. The sealing apparatus 90 includes a buffer 64 for buffering a time difference between the injecting apparatus 80 and the sealing apparatus 90, a residual liquid crystal remover 66 for removing contaminated liquid crystal at liquid crystal injection holes in the liquid crystal injecting process, a sealer 68 for sealing liquid crystal injection holes, a seal confirming unit 70 for confirming a sealed state, an ultraviolet irradiating unit 72 for hardening a sealant, and an unloader 74 mounted with a cassette.

In operation, the liquid crystal display panels in which liquid crystal has been injected by the injecting apparatus 80, are conveyed via the elevator 62 into the buffer 64. The buffer 64 temporarily loads the substrates to buffer a time difference between the injecting apparatus 80 and the sealing apparatus 90. Thereafter, the liquid crystal display panels are conveyed into the residual liquid crystal remover 66. The residual liquid crystal remover 66 absorbs the contaminated liquid crystal at the liquid crystal injection holes to eliminate residual liquid crystal. At this time, the residual liquid crystal is eliminated by an $N_2$ blow system or a vacuum system. The liquid crystal panels in which residual liquid crystal has been eliminated by the residual liquid crystal remover 66 are conveyed to the sealer 68. The sealer 68 seals the liquid crystal injection holes using a roller. In this case, since the injection holes of the liquid crystal display panels are sealed in a downward state, it is not required to invert the cassette. The liquid crystal panels sealed by the sealer 68 are conveyed to the seal-confirming unit 70. The liquid crystal display panels conveyed to the seal-confirming unit 70 are rotated at a desired angle preferably by a robot (not shown) so that a worker can confirm, by the naked eye, that the liquid crystal injection holes have been sealed. Thereafter, the liquid crystal panels are conveyed to the ultraviolet irradiating unit 72. The ultraviolet irradiating unit 72 irradiates an ultraviolet ray to harden the sealant. Preferably, the ultraviolet irradiating unit 72 collectively irradiates an ultraviolet ray by a lamp scanning system to improve cell gap variation. Thereafter, the cassette loaded with the liquid crystal panels is mounted in the unloader 74.

The residual liquid crystal removing process and the sealing process will be described in detail with reference to FIG. 5 and FIG. 6.

Figure 5:
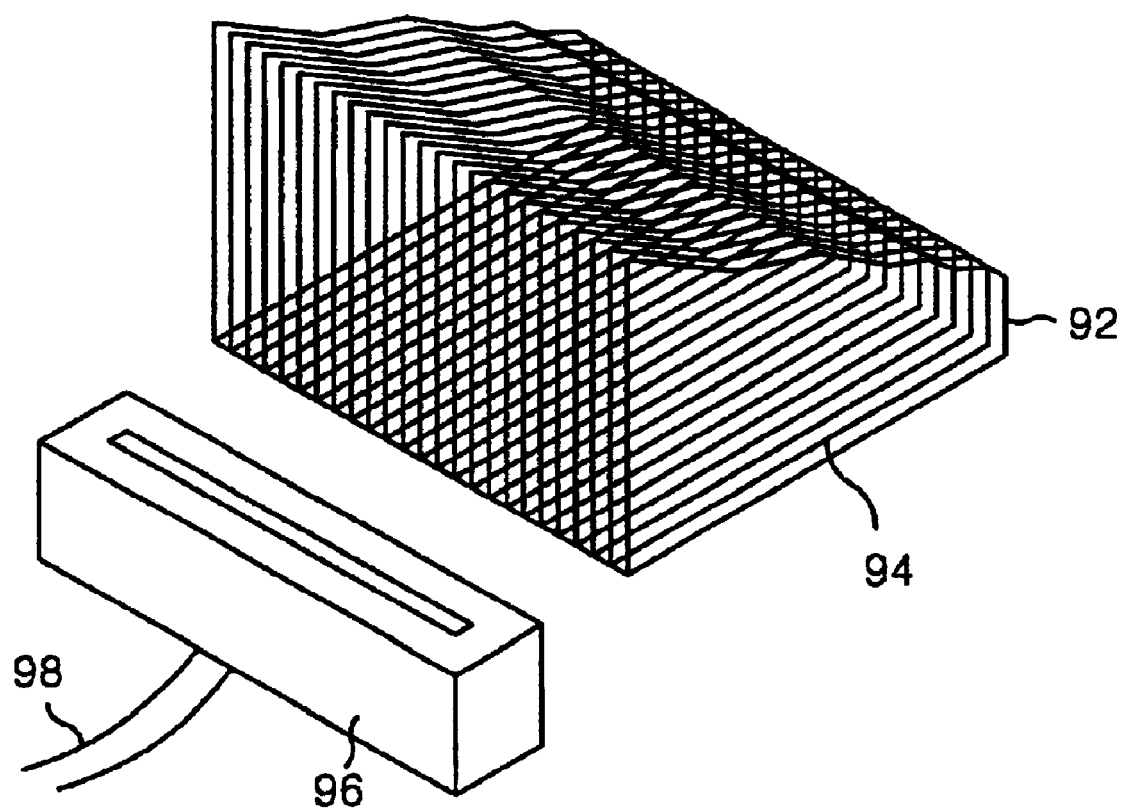
FIG. 5 is a perspective view of the residual liquid crystal remover in the liquid crystal injecting/sealing apparatus shown in FIG. 4.

Referring now to FIG. 5, the residual liquid crystal remover 66 includes a liquid crystal display panel 92 into which a liquid crystal is injected, and a liquid crystal removing unit 96 installed in parallel to the conveying direction of the liquid crystal display panel 92 to remove contaminated liquid crystal. The liquid crystal display panel 92 is conveyed to the residual liquid crystal remover 66 by means of a conveyer (not shown) after the liquid crystal is injected. When the liquid crystal display panel 92 has been conveyed to locate a liquid crystal injection hole 94 above the liquid crystal removing unit 96, a pump (not shown) connected to a vacuum line 98 absorbs the contaminated liquid crystal.

Figure 6:
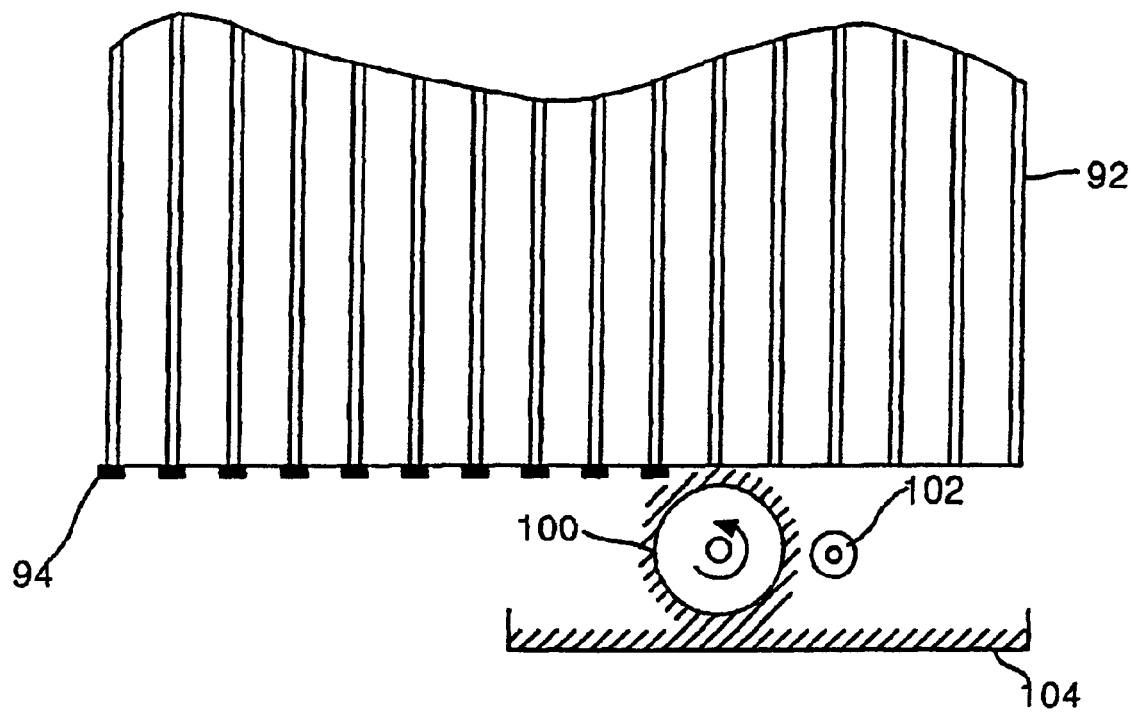
FIG. 6 is a side view of the sealer in the liquid crystal injecting/sealing apparatus shown in FIG. 4.

Referring to FIG. 6, the sealer 68 includes a liquid crystal panel 92 into which liquid crystal has been injected, a roller 100 installed perpendicularly to the conveying direction of the liquid crystal display panel 92 to seal the liquid crystal injection hole 94, a sealant box or container 104 filled with a sealant, and a leveler 102 installed at the side of the roller 100 to uniformly keep a thickness of the sealant sealing the liquid crystal injection hole 94. After a liquid crystal is injected into the liquid crystal display panel 92, it is conveyed to the sealer 68 by means of a conveyer (not shown). When the liquid crystal display panel has been conveyed to the sealer 68, the rotating roller 100 absorbs the sealant filled in the sealant box 104 to seal the liquid crystal injection hole 94. At this time, the leveler 102 uniformly keeps a thickness of the sealant absorbed to the roller 100.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An injecting and sealing apparatus of a liquid crystal display device comprising:

an elevator for conveying a liquid crystal display panel having a liquid crystal injection hole from the injecting apparatus to the sealing apparatus;

a residual liquid crystal remover for removing contaminated liquid crystal at a periphery of the liquid crystal injection hole, the residual liquid crystal remover having a liquid crystal removing unit for removing the contaminated liquid crystal and a vacuum line for evacuating the contaminated liquid crystal;

a sealer for sealing the liquid crystal injection hole with a sealant; and an ultraviolet irradiating unit for hardening the sealant.

2. The apparatus of claim 1, further comprising at least one buffer for temporarily storing the liquid crystal display panel conveyed between the injecting apparatus and the sealing apparatus.

3. The apparatus of claim 1, further comprising a seal-confirming unit for confirming a seal state of the liquid crystal display panel.

4. The apparatus of claim 1, wherein the injecting apparatus includes:
- a loader for loading the liquid crystal display panel;
- a pre-heater for heating the liquid crystal display panel;
- a vacuum unit for causing an interior of the liquid crystal display panel to be in a vacuum state; and
- an injector for injecting liquid crystal into the liquid crystal display panel.

5. The apparatus of claim 4, wherein the pre-heater includes:
- a first pre-heater for activating contaminants of the liquid crystal; and
- a second pre-heater for heating the liquid crystal display panel.

6. The apparatus of claim 4, wherein the injector includes;
- a first injector for placing the liquid crystal display panel in an atmospheric state; and
- a second injector for injecting liquid crystal into the liquid crystal display panel.

7. The apparatus of claim 1, wherein the vacuum line is provided at a rear side of the liquid crystal removing unit.

8. The apparatus of claim 1, wherein the sealer includes:
- a roller for sealing the liquid crystal injection hole;
- a sealant box filled with a sealant; and
- a leveler for maintaining a thickness of the sealant.

9. A method of injecting and sealing a liquid crystal display panel comprising:
- conveying a plurality of liquid crystal display panels each having a liquid crystal injection hole from an injecting apparatus to a sealing apparatus;
- removing contaminated liquid crystal at a periphery of each liquid crystal injection hole;
- sealing the liquid crystal injection holes of the liquid crystal display panels with a sealant using a roller; and
- hardening the sealant by irradiating a ultraviolet ray.

10. The method of claim 9, wherein said sealing includes sealing the injection holes in a downward state.

11. The method of claim 9, wherein the injecting apparatus includes:
- a loader for loading the liquid crystal display panels;
- a pre-heater for heating the liquid crystal display panels;
- a vacuum unit for causing an interior of the liquid crystal display panel to be in a vacuum state; and
- an injector for injecting liquid crystal into the liquid crystal display panels.

12. The method of claim 9, further comprising, prior to the sealing, temporarily storing the liquid crystal display panels between the injecting apparatus and the sealing apparatus.

13. The method of claim 9, wherein the contaminated liquid crystal is removed by an N2 blow system.

14. The method of claim 9, wherein the contaminated liquid crystal is removed by a vacuum system.

15. The method of claim 9, wherein said hardening includes irradiating an ultraviolet ray by a lamp scanning system.

16. The method of claim 15, wherein the liquid crystal injection holes collectively harden by the lamp scanning system.

17. An in-line injecting and sealing apparatus of a liquid crystal display device comprising:
- an elevator conveying a liquid crystal display panel having a liquid crystal injection hole from the injecting apparatus to the sealing apparatus;
- a residual liquid crystal remover removing contaminated liquid crystal at a periphery of the liquid crystal injection hole;
- a sealer sealing the liquid crystal injection hole with a sealant; and
- an ultraviolet irradiating unit hardening the sealant.

18. The apparatus of claim 17, comprising at least one buffer temporarily storing the liquid crystal display panel conveyed between the injecting apparatus and the sealing apparatus.

19. The apparatus of claim 17, further comprising a seal-confirming unit confirming a seal state of the liquid crystal display panel.

20. The apparatus of claim 17, wherein the injecting apparatus includes:
- a loader loading the liquid crystal display panel;
- a pre-heater heating the liquid crystal display panel;
- a vacuum unit causing an interior of the liquid crystal display panel to be in a vacuum state; and
- an injector injecting liquid crystal into the liquid crystal display panel.

21. The apparatus of claim 20, wherein the pre-heater includes:
- a first pre-heater activating contaminants of the liquid crystal; and
- a second pre-heater heating the liquid crystal display panel.

22. The apparatus of claim 20, wherein the injector includes;
- a first injector placing the liquid crystal display panel in an atmospheric state; and
- a second injector injecting liquid crystal into the liquid crystal display panel.

23. The apparatus of claim 17, wherein the residual liquid crystal remover includes:
- a liquid crystal removing unit removing the contaminated liquid crystal; and
- a vacuum line evacuating the contaminated liquid crystal.

24. The apparatus of claim 23, wherein the vacuum line is provided at a rear side of the liquid crystal removing unit.

25. The apparatus of claim 17, wherein the sealer includes:
- a roller sealing the liquid crystal injection hole;
- a sealant box filled with a sealant; and
- a leveler maintaining a thickness of the sealant.

* * * * *